April 21, 1942.　　T. MOJONNIER ET AL　　2,280,529
VAT
Original Filed March 7, 1940　　8 Sheets-Sheet 1

Inventor
Timothy Mojonnier
Julius J. Mojonnier
and Oliver W. Mojonnier
By Thomas H. Ferguson
Attorney

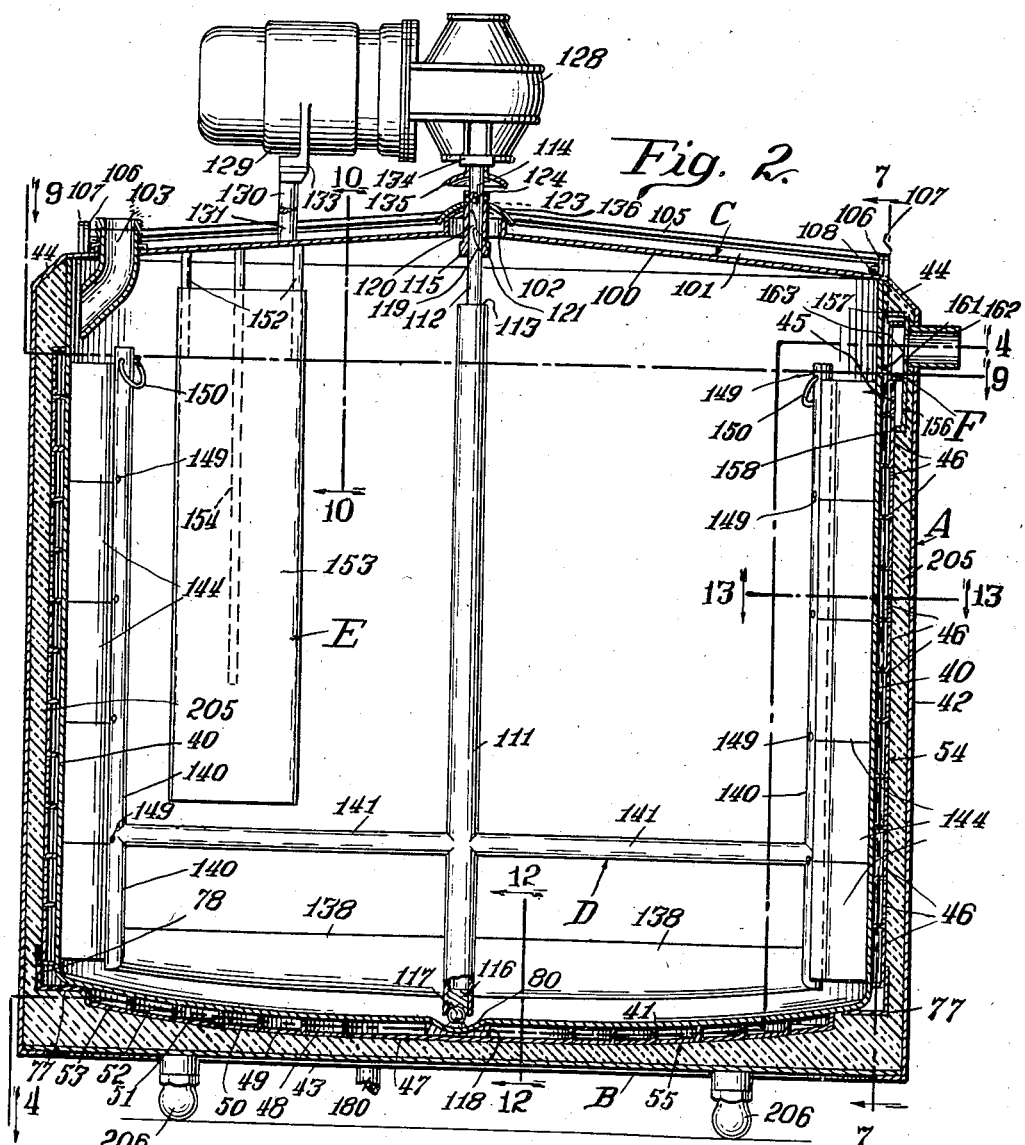
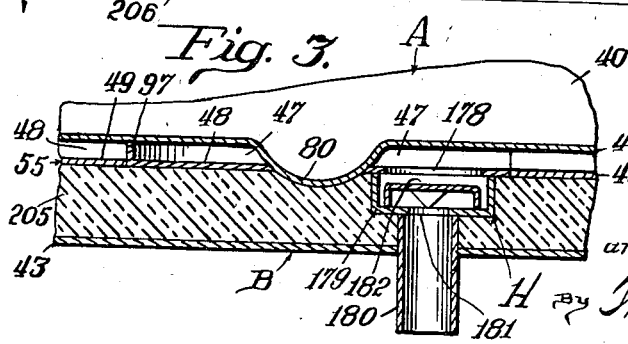

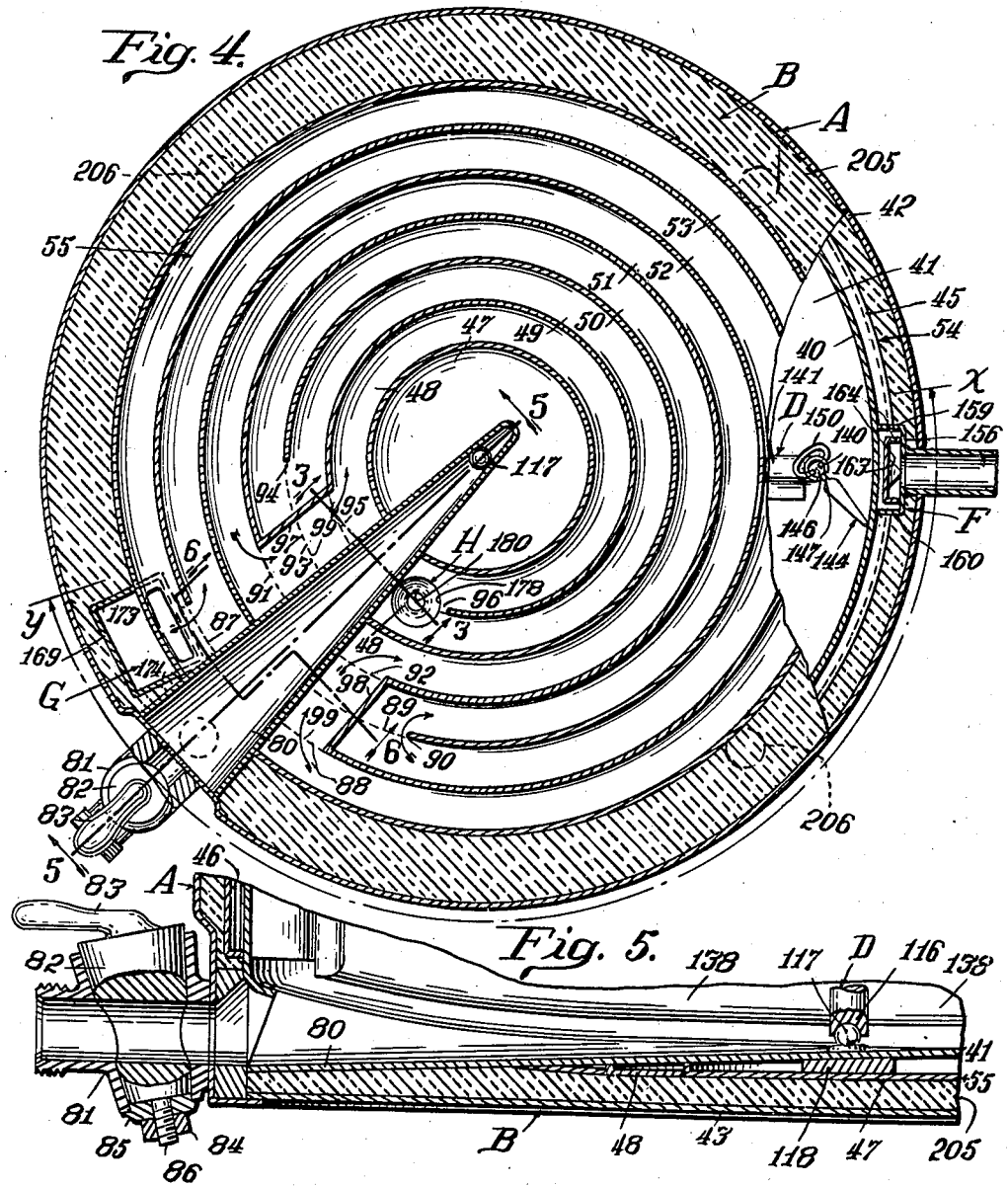
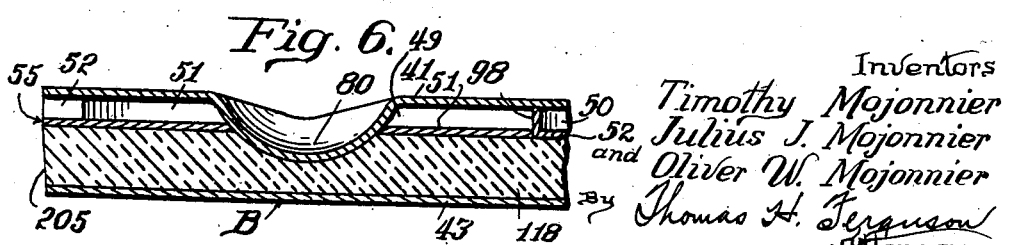

April 21, 1942. T. MOJONNIER ET AL 2,280,529
VAT
Original Filed March 7, 1940  8 Sheets-Sheet 4
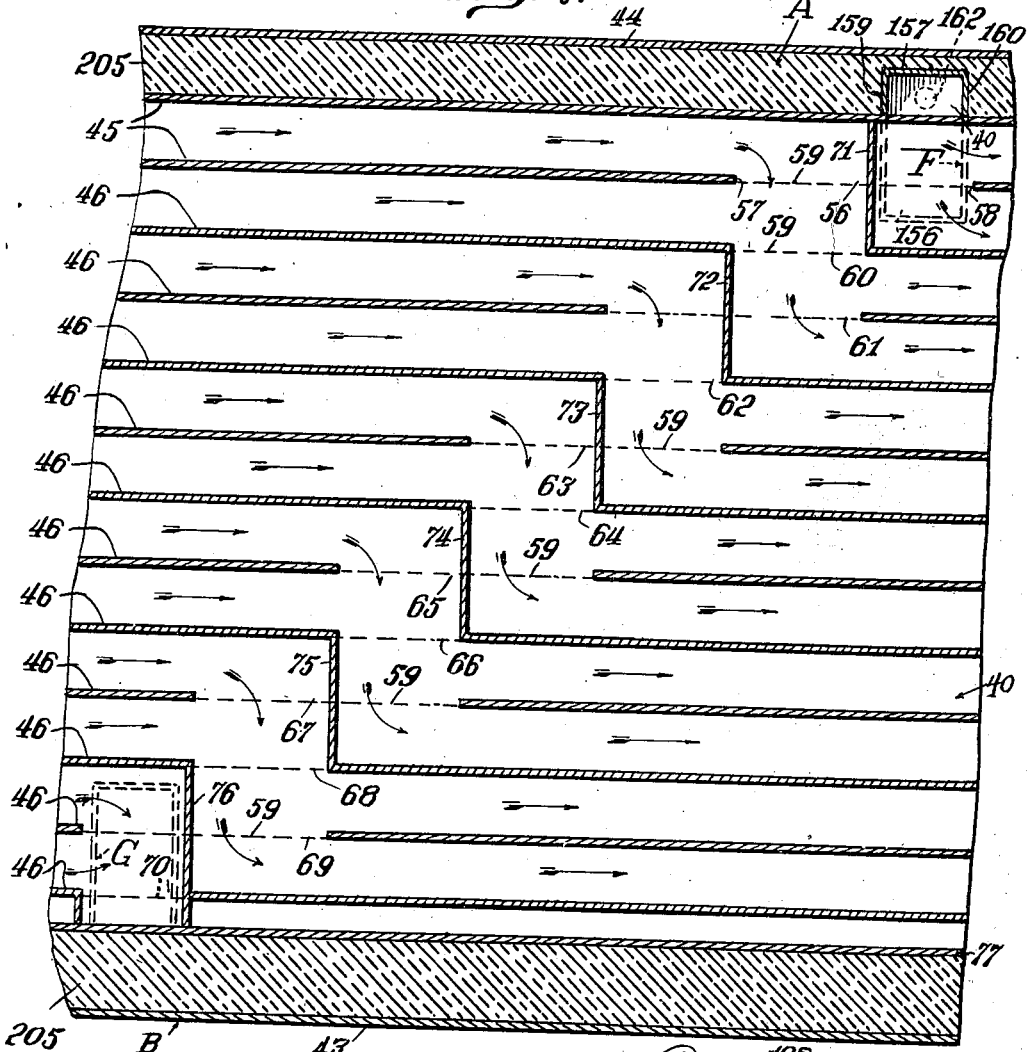
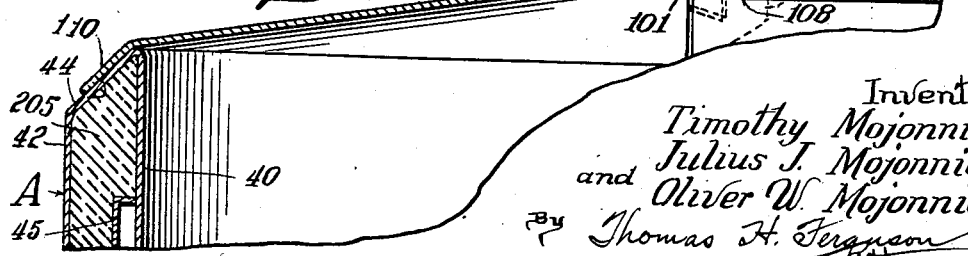
Inventors
Timothy Mojonnier
and Julius J. Mojonnier
Oliver W. Mojonnier
By Thomas H. Ferguson
Attorney

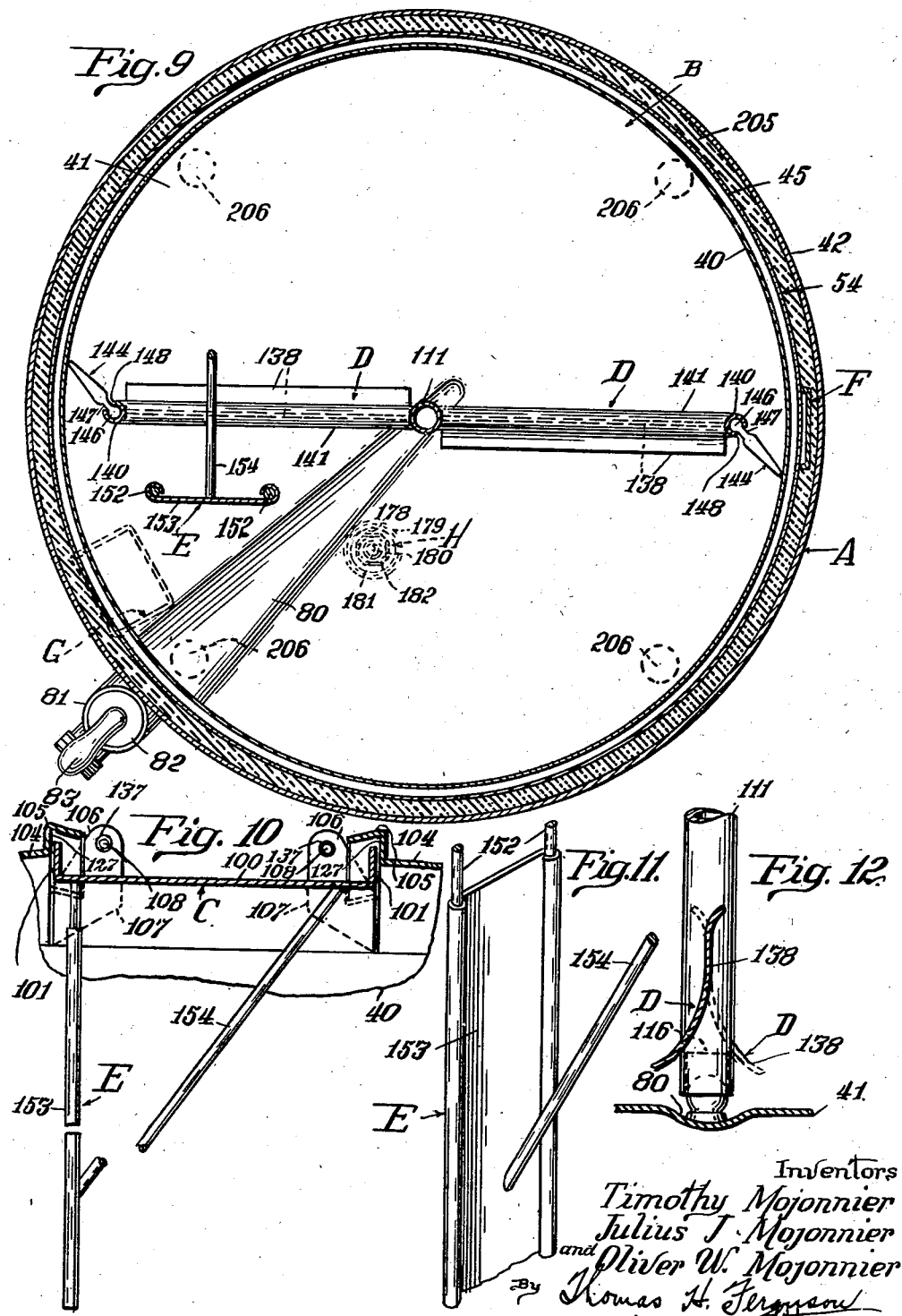

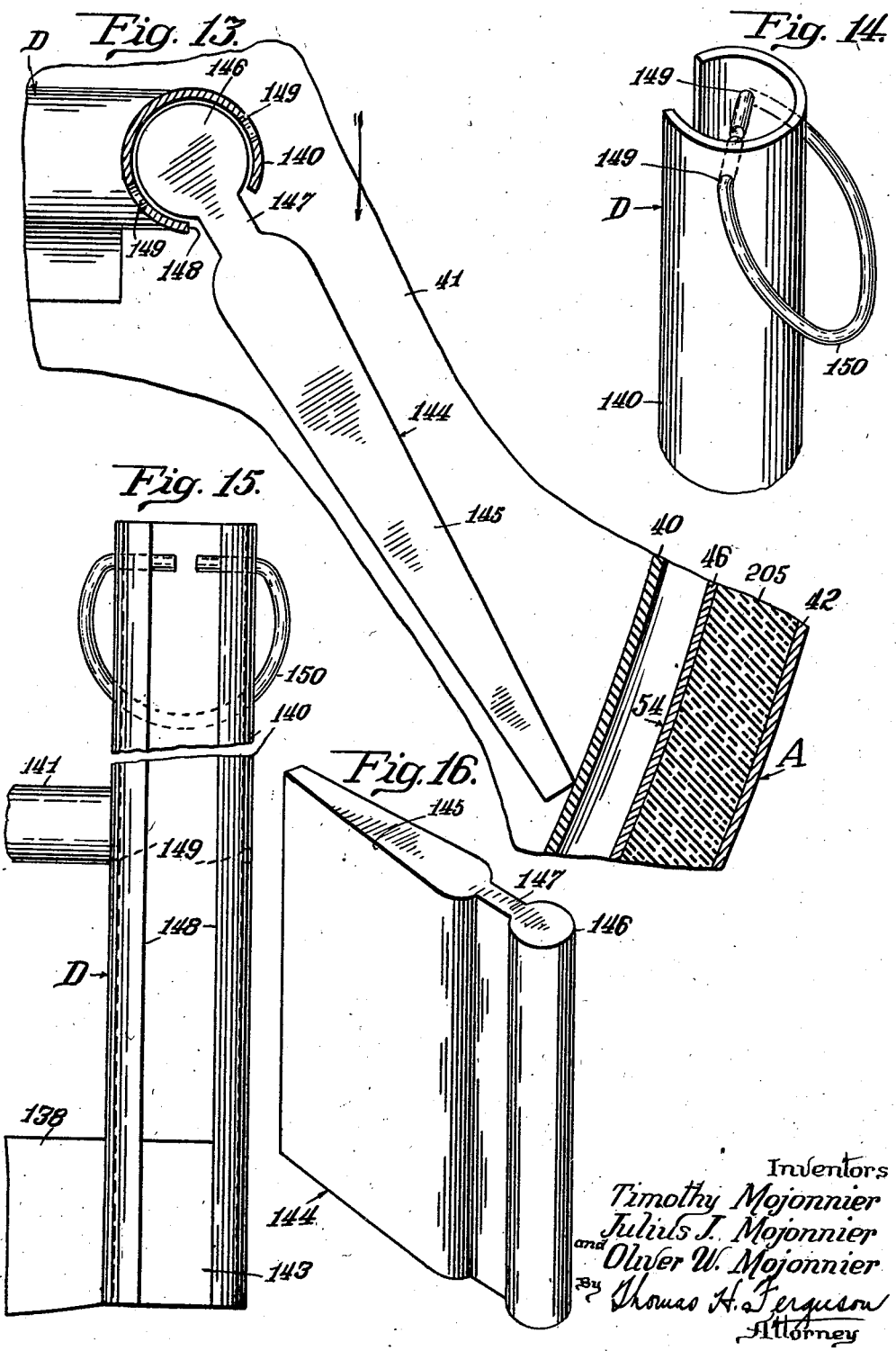

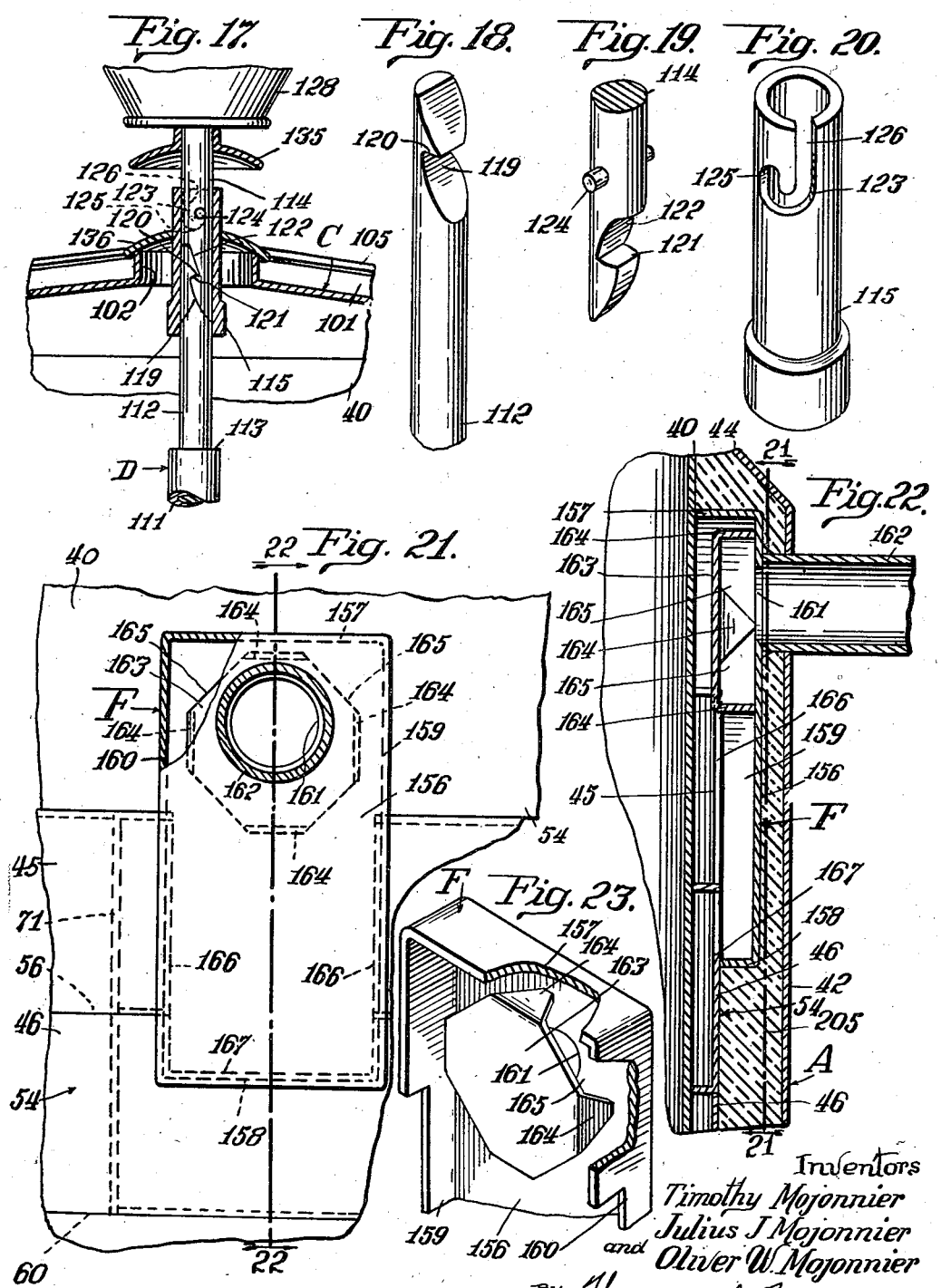

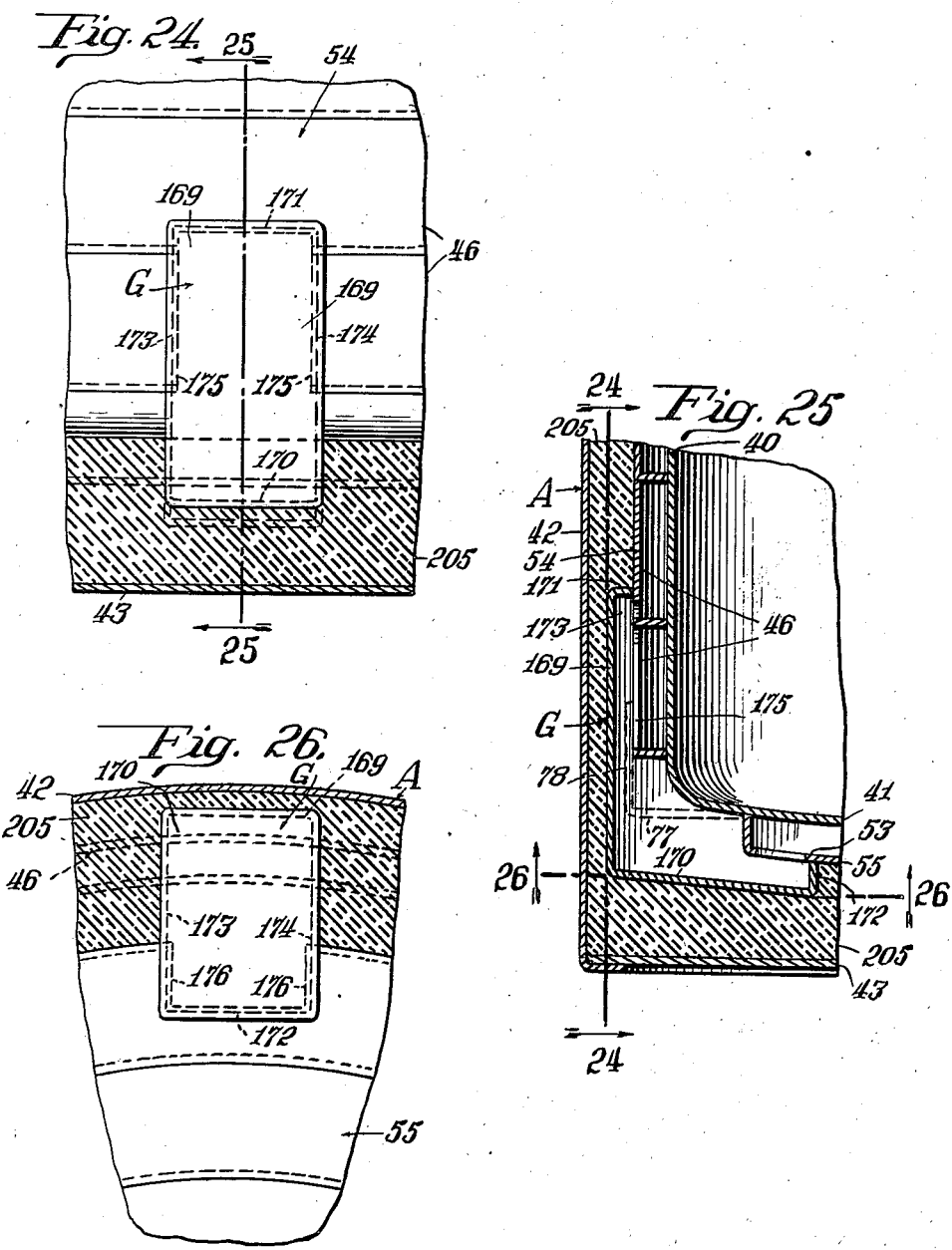

Patented Apr. 21, 1942

2,280,529

UNITED STATES PATENT OFFICE 2,280,529

VAT

Timothy Mojonnier and Julius J. Mojonnier, Oak Park, and Oliver W. Mojonnier, River Forest, Ill., assignors to Mojonnier Bros. Co., a corporation of Illinois Original application March 7, 1940, Serial No. 322,770. Divided and this application July 26, 1940, Serial No. 347,653

18 Claims. (Cl. 259—108)

The present invention relates to vats and more particularly vats wherein the substance being treated is mechanically agitated.

One object of the invention is to provide a novel agitator and scraper construction, one which may be readily assembled in different heights and one which may be easily disassembled and cleaned. To this end the scrapers are made up in sections and they are removably positioned in one or more traveling uprights. Likewise the main rotary shaft with the agitating elements attached, but with the scraping elements removed, may be moved bodily from the vat and cleaned. The different sections also give a cleaner scraping action against the interior wall of the vat, since each section has only its own zone to scrape. The scrapers are also made of softer material than the interior surface of the vat wall, and so, whatever wear there is, comes principally upon the scrapers and not upon the wall.

Another object is to provide a novel cover construction which includes a central bridge and a pair of segmental hinged covers which are properly shaped to drain objectionable liquids beyond the limits of the vat. Thus objectionable liquids are kept out of the vat. It is also intended that the segmental openings provided when the covers are raised, shall be such that the agitator frame as a whole may be moved into and out of the vat through either of the openings. Contributing to this end, the agitator shaft is also made separable and provided with novel draining members in the shape of, and commonly called, "hats."

Another object is to prevent a novel scraper and baffle arrangement by which the liquid contents of the vat shall be properly and efficiently moved about as the agitator operates.

Other objects have to do with sanitation, economy of manufacture, ease and efficiency in operation, replacement and repair and in details of construction other than those heretofore mentioned.

For a fuller understanding of the invention, reference should be had to the following detailed description taken in connection with the accompanying drawings. For a measure of the scope of the invention reference should be made to the appended claims.

The channel and housing structure shown and described in connection with the vat in and upon which our novel features of invention are located is not claimed herein as part of the present invention but is fully disclosed and claimed in our prior application, Serial No. 322,770, filed March 7, 1940, which application is a parent application out of which the present application is divided. This parent application has now become Patent No. 2,277,526, dated March 24, 1942.

Referring to the accompanying drawings, Fig. 1 is a perspective view of a vat constructed and arranged in accordance with the invention disclosed and claimed in said parent application, portions of the side wall structure being broken away to show the various elements which make up the wall, likewise the position of certain of the channel elements being indicated in dash lines, so as to diagrammatically represent the path of travel of the fluid through the wall channels.

Fig. 2 is a central vertical section of the vat, the plane of section being lengthwise of the cover carrying bridge.

Fig. 3 is a fragmentary sectional view through a portion of the vat bottom showing the lowermost terminal housing which ordinarily constitutes the outlet for the fluid passing through the vat channels.

Fig. 4 is an irregular sectional view illustrating principally the channel forming angle-iron members of the vat bottom, the position of the section being indicated by the line 4—4 of Fig. 2.

Fig. 5 is a radial vertical section through a portion of the vat bottom, illustrating particularly the draining gutter through which the vat contents flow when the vat is being emptied, the plane of section being indicated by the line 5—5 of Fig. 4.

Fig. 6 is a transverse sectional view similar to Fig. 3 but taken nearer the gutter's outlet, the position of the section being indicated by the irregular line 6—6 of Fig. 4.

Figure 1:
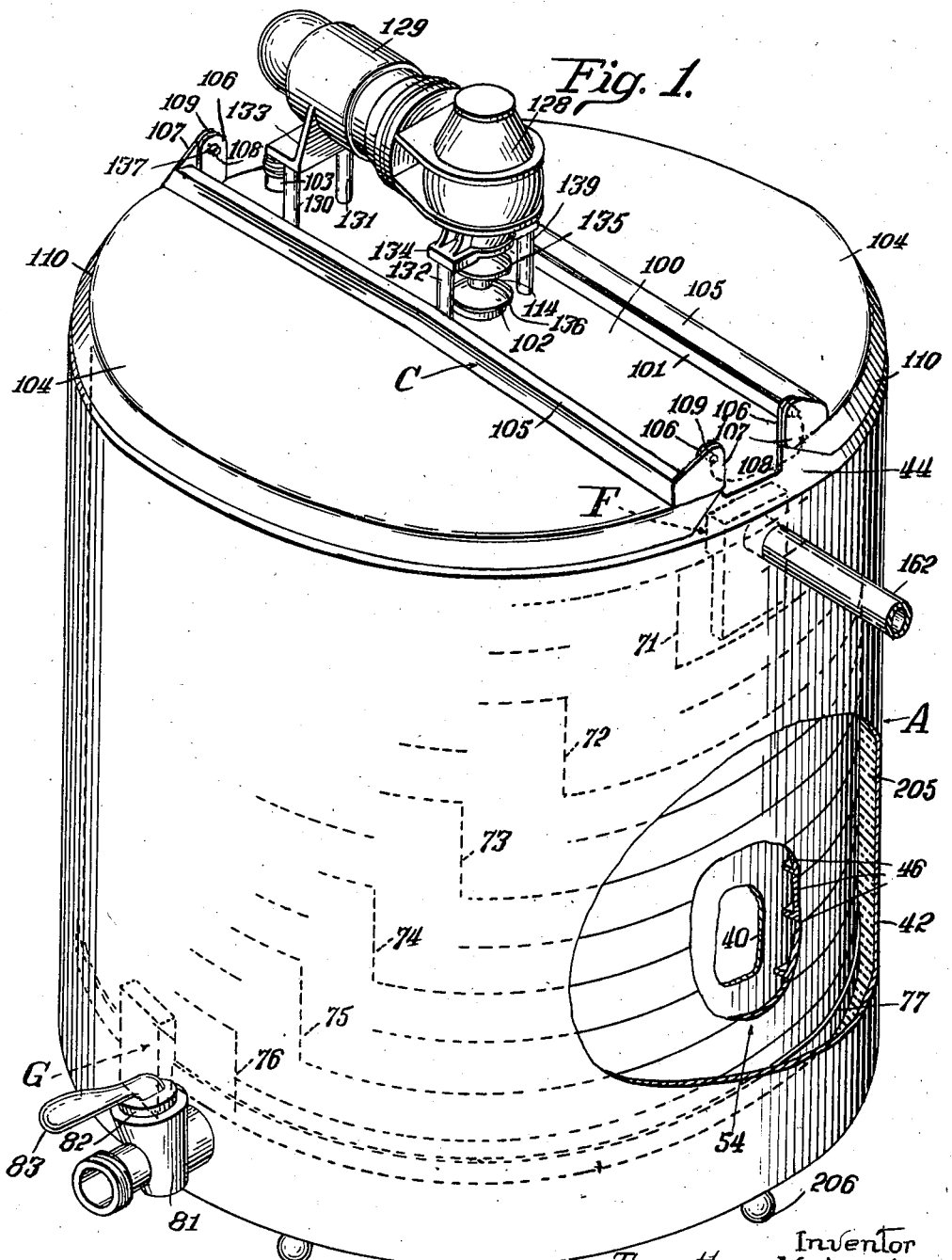

Fig. 7 is a development of a portion of the wall structure of the vat, showing flange openings and associated bulkheads or partitions by which the path of flow of the heat exchange medium through the wall structure is determined, the extent of the developed surface being indicated by the circumferential line extending between the points $x$ and $y$ of Fig. 4 and the position of the section being indicated by the line 7—7 of Fig. 2.

Fig. 8 is a transverse sectional view of a portion of the vat, its bridge and one of the covers carried by the latter, the plane of section being at right angles to that of Fig. 2.

Fig. 9 is a horizontal sectional view taken on a plane indicated by the line 9—9 of Fig. 2 and illustrating the agitator and associated wall scrapers as well as the interior of the vat.

Fig. 10 is a transverse sectional view through the bridge, illustrating also the baffle which is carried by the bridge, the plane of section being indicated by the line 10—10 of Fig. 2.

Fig. 11 is a perspective view of a portion of the baffle and its supporting strut.

Fig. 12 is a transverse section through one blade of the agitator, taken at a point adjacent to the agitator shaft, as indicated by the line 12—12 of Fig. 2.

Fig. 13 is a fragmentary view illustrating upon a large scale one of the scrapers in association with the tank wall and other parts, the upright and tank being shown in section, the plane of section being indicated by the line 13—13 of Fig. 2.

Fig. 14 is a perspective view of the upper end of one of the scraper carrying uprights, showing the retaining ring in position but without any of the scrapers therein.

Fig. 15 is an elevation of one of the scraper carrying uprights, a portion of the center of it being broken away to reduce the size of the figure.

Fig. 16 is a perspective view of a detached scraper or scraper section.

Fig. 17 is a central vertical section through a portion of the bridge and the associated coupling by which the agitator shaft lengths are secured together.

Fig. 18 is a perspective view of the upper locking end of the lower longer length of the agitator shaft.

Fig. 19 is a similar view of the lower locking end of the upper agitator shaft length.

Fig. 20 is a perspective view of the coupling sleeve by which the shaft lengths are secured together.

Fig. 21 is an elevation of one of the terminal housings and an associated connecting pipe, the view being taken inwardly of the outer casing of the vat as indicated by the line 21—21 of Fig. 22, and the insulation being omitted.

Fig. 22 is a vertical section of the same housing and pipe connection, the section, however, including also the outer casing of the vat, the plane of section being indicated by the line 22—22 of Fig. 21.

Fig. 23 is a perspective view of the housing of Fig. 21, removed from the other parts and with wall and end portions broken away so as to particularly illustrate the inclosed baffle.

Fig. 24 is a view similar to Fig. 21 illustrating a junction housing employed for establishing communication between the channels of the side wall and bottom of the vat, the position of the view being indicated by the line 24—24 of Fig. 25, and the insulation beneath the bottom only being shown.

Fig. 25 is a vertical section similar to Fig. 22 illustrating the junction housing in position, the plane of section being indicated by the line 25—25 of Fig. 24.

And Fig. 26 is an underneath view which illustrates the same junction housing independently of the bottom inclosing casing wall, the position of the view being indicated by the line 26—26 of Fig. 25, and the insulation in the wall only being shown.

Throughout these views like characters refer to like parts.

The particular vat which is illustrated includes a peripheral wall A, a bottom B, a top and cover construction C, an agitator D, a baffle E, an inlet housing F, a junction housing G, and an outlet housing H. These housings cooperate with the channels in the wall and bottom to provide a path for the heat exchange medium.

In forming the container walls and bottom, we employ for the wall A an inner cylindrical plate or wall 40 which is secured at its lower edge, preferably by welding, to the outer edge of a plate 41 of the bottom B. These plates 40 and 41 constitute the liquid contacting plates of the vat and form the inner shell of the same. They may consist of any desired material. Where milk and milk products are to be placed within the vat, chromium or chromium plated metal is a good non-contaminating metal and may be used to advantage. Obviously, other metals may be employed for these liquid contacting plates. The outer plate 42 of the wall A is likewise cylindrical and of sufficiently greater diameter than the wall 40 to leave a substantial space between the two walls. This enclosing outer plate 42 is connected at its lower edge to the outer edge of a circular plate 43 which forms the lowermost plate or second bottom forming wall of the bottom B. These plates may be secured together in any desired way. These two plates 42 and 43 thus connected constitute the outer shell of the vat. Although the plates 42 and 43 need not be composed of chromium or chromium alloys, yet where such material is employed, the outer surface may be given a fine appearance and the same also constitutes a sanitary surface. This would apply particularly to the peripheral plate 42 which is more exposed to view and to contact. As clearly shown, the upper ends of the wall plates 40 and 42 are connected together by a beveled flange 44 formed upon the outer plate 42 and joined at its upper inner edge to the upper edge of the inner wall plate 40.

In forming the channels for the wall A and bottom B, as before noted, angle irons having broad plate-like sections and relatively short flanges are employed. In making up the peripheral wall A, the angle irons may differ among themselves. In the embodiment illustrated, the uppermost member 45 is in a strict sense a channel bar, since it has two flanges with an intervening plate portion, whereas the others, designated 46, are in a strict sense angle bars, since each, although having a plate portion, has only one flange. Thus, one channel bar and eleven angle bars are used in the wall structure. Each of these bars is bent into a complete loop or ring and its ends are joined together to make it continuous throughout. Then these rings 45 and 46 are slipped, one by one, over the cylindrically formed plate 40 and have their flanges secured to said plate by welding. Obviously, this may be done in different ways. Thus, if the bottom plate 41 be first secured to the wall plate 40, then the vat as thus partially formed may be turned upside down and the channel bar 45 first moved down into the position it is to occupy on the outside of the wall 40. When thus positioned, the free ends of the short flanges are welded to the wall 40. Then the next angle iron ring 46 is slipped over the structure and its plate portion is brought down into bearing against the adjacent wall of the channel iron 45. When this position is reached, the first angle bar 46 is welded to the angle iron 45 throughout their contacting lengths. Likewise, the flange of the first angle bar member 46 is welded to the plate 40. Following this, the second angle bar 46 is similarly positioned and welded. Then the remaining bars 46 are successively positioned and welded, until all of the eleven bars 46 are thus secured in place. Thus, the channel forming members 45 and 46, when in place, have their plate portions upright and their flanges substantially horizontal.

When this positioning and welding of the angle iron members 45 and 46 is completed, then, under the assumption that the wall plate 40 and bottom plate 41 are welded together, as before stated, the channel forming members 47, 48, 49, 50, 51, 52 and 53 may be placed upon the bottom plate 41 and similarly welded together and to the plate. It should be noted that these bottom forming angle irons are not identical, but, starting with central member, the succeeding members are made larger in diameter so as to successively fit in nested relation, each with a fit to the next succeeding member. In other words, the several bottom forming members have substantially nesting dimensions. Thus, in the embodiment shown, the member 47 has its plate-like portion in the form of a disk and around the periphery of the disk a flange is formed. The next member 48 is in the form of a ring or loop and its inner edge is welded to the member 47, while its outer edge is provided with an upturned flange which is welded to the plate 41. Similarly, the member 49 is a circular ring or loop and its inner edge is welded to the member 48 and its upturned flange is welded to the plate 41. Likewise, the members 50, 51, 52 and 53 are circular loops, of successively larger size and fitted and welded together and to the plate 41. Thus, the set of nesting bottom forming loops have upstanding flanges and substantially horizontal plate portions.

With the wall and bottom construction so formed, the angle iron members form angle iron walls. The angle iron wall formed by the members 45 and 46 is the wall 54, parallel to the plate 40 of the wall A, and that formed by the bottom forming angle iron members 47, 48, 49, 50, 51, 52 and 53 is the wall 55, parallel to the dished plate 41 of the bottom B. These walls 54 and 55 are supplemental to the principal walls formed by the plates 40 and 42 on the one hand and the plates 41 and 43 on the other.

Although the wall-forming angle-iron loops come together and are welded together to form closed loops, as in the case of the angle-irons 45 and 46; yet in other cases the loops are not closed, their ends are not brought together and welded together, as in the case of the bottom-forming member 48, 49, 50, 51, 52 and 53. There the ends, for the most part, contact the walls of the gutter, hereinafter referred to.

With the angle-irons cut, shaped and mounted as thus far described, that is to say, without any portions of the flanges being cut away, there would be in the wall A twelve circular channels arranged, one above the other, and in the bottom B there would be six circular channels all concentrically arranged. Now, in order to provide a prolonged path for the flow of the medium through all of these channels, it is necessary to have the flanges cut away at certain points. This may be done so as to provide various paths, one or more. Thus, the different channels may be connected in series or in parallel, in various combinations, as desired. In the embodiment under consideration, the chambers are arranged in parallel with two channels in each set.

The channel arrangement which is illustrated in Fig. 7 is that just referred to. As shown by the section indicating line 7—7 of Fig. 2, the view is taken inward against the inner wall 40 to which the short flanges of the angle irons are welded, as explained. In the development of Fig. 7, it will be noted that the lower flange of the angle iron member 45 is cut away to provide a wide opening 56 which extends between the points 57 and 58. The cut-away weld is indicated by a dash line 59. The next cut-away portion is made to provide the opening 60 in the flange of the first angle-iron member 46. Here again, the cut-away weld is indicated by a similar dash line 59. This opening 60 is narrower than the opening 56, as is clearly shown. The next opening is a wide opening 61 in the flange of the second member 46. The next opening is a narrow opening 62 in the flange of the third member 46. These are followed successively by a wide opening 63, a narrow opening 64, a wide opening 65, a narrow opening 66, a wide opening 67, a narrow opening 68, a wide opening 69, and a narrow opening 70, formed in the succeeding flanges and off-set laterally, as clearly shown. In each instance the cut-away weld is indicated by a dash line 59, the same as before.

Cooperating with this series of wide and narrow openings are bulkheads or partitions. These have the same depth as the flanges of the members 45 and 46 and are welded to the adjacent parts so as to form tight joints and thereby to positively direct the flow of the medium the same as the flanges. The first of these is the bulkhead 71 which unites the upper flange of the member 45 with the flange of the first or uppermost member 46. The second bulkhead 72 unites the flange of the first member 46 to the flange of the third member 46. Again, bulkhead 73 unites the flange of the third member 46 to the flange of the fifth member 46. Again, bulkhead 74 joins the flange of the fifth member 46 to the flange of the seventh member 46. Likewise, bulkhead 75 unites the flanges of the seventh and ninth members 46. Again, bulkhead 76 units the flanges of the ninth and eleventh members 46. It will be noted also that this bulkhead extends to the lower arm of an angle strip 77 which is used to firmly unite the lowermost angle bar 46 with the bottom plate 41, as clearly illustrated, more particularly in Fig. 2. A partition 78 also unites the flange of the lowermost member 46 to the lower arm of the member 77 at a point adjacent to the junction housing G. In this connection it may be noted that the terminal inlet housing F is located adjacent to the bulkhead 71. In the development of Fig. 7, there are also shown the beveled plate 44 of the wall A and the lowermost plate 43 of the bottom B. It will be noted that the bulkhead 71 bisects the opening 56; the bulkhead 72, the opening 61; the bulkhead 73, the opening 63; the bulkhead 74, the opening 65; the bulkhead 75, the opening 67; and the bulkhead 76, the opening 69. The channel arrangement of Fig. 7 is also shown in dotted lines in Fig. 1, although in the latter figure only the bulkheads are designated. This is done for simplicity and yet by noting their relation to the flanges and openings, it is possible to trace out the meandering path through the wall channels as well in Fig. 1 as in Fig. 7.

With this arrangement it will be seen that a heat exchange medium entering at the housing F will pass to the right from the housing and on through in parallel streams until it returns practically to the bulkhead 71. There the parallel streams will be directed by way of the left-hand portion of the opening 56, the opening 60, and the right-hand portion of the opening 61 into the next lower pair of channels through which it will travel to the right. Upon completing its circuit at this level, this pair of streams will come against the bulkhead 72 and be directed through the left-hand portion of opening 61, the opening 62, and the right-hand portion of the opening 63 into the third pair of channels through which it will travel to the right. Likewise, the path of travel will be continued after the third cycle through the left-hand portion of opening 63, the opening 64, the right-hand portion of the opening 65, and on through the fourth cycle. Then after the fourth cycle the streams will pass through the left-hand portion of opening 65, the opening 66, and the right-hand portion of opening 67. After the fifth cycle the streams will pass through the left-hand portion of the opening 67, the opening 68, and the right-hand portion of the opening 69. Then, after the final cycle the parallel streams will enter the junction housing G and pass into the channels of the bottom B. This is in accordance with the detailed illustration.

Passing now to a consideration of the channels of the bottom of the vat, it will be seen that these are associated with a gutter 80 which extends from a point adjacent to the center of the bottom outward radially to its outer edge. The bottom of the gutter 80 is given a downward and outward inclination so that liquid within the tank may be drained to the outer edge of the tank through a suitable discharge opening formed by the valve casing 81. The opening through the case 81 is controlled by a plug valve 82 manually operated by a handle 83. A nut 84 and washer 85 cooperate with a threaded stud 86 on the end of the valve 82 to provide proper adjustment of the valve in its seat formed in the casing 81. The inner end of the valve casing 81 is suitably secured to the vat walls by welding or the like. Its outer end is threaded for connection with a suitable discharge pipe. It will be noted that the upper edges of the gutter 80, which is composed of sheet metal, terminate at the level of the bottom 41 and are suitably secured thereto by welding.

The wall of the gutter 80 forms a barrier at which the various constituent nested loops 47, 48, 49, 50, 51, 52 and 53 terminate. In other words, the various loops outside the central disk-like plate 47 are loops which do not meet at their ends but abut against the walls of the gutter 80. These gutter walls serve in certain instances in determining the path of travel of the fluid through the bottom channels, as did the bulkhead partitions of the channel arrangement of the wall A.

Upon following out the openings provided by cutting away portions of the flanges of the bottom channel members, we see that the flange of member 52 is cut away to provide an opening 87 adjacent to one side of the gutter 80 and it is cut away at its opposite end to provide an opening 88 near the other side of the gutter 80. When it comes to the flange of the member 51 we find that it is provided with a wide opening 89 that extends from the point 90 to the adjacent wall of the gutter 80 on that side of the gutter which is adjacent to the opening 88. Upon coming to the member 50 we find it is provided with two openings 91 and 92 at its opposite ends in a way similar to the flange of member 52. Coming to the member 49 we find that its flange is provided with a wide opening 93 which extends from the point 94 to the adjacent wall of the gutter 80 and is located on that side of the gutter which is adjacent to the opening 91. The member 48 in turn has its flange ends cut away to provide openings 95 and 96. The flange of the member 47 is not cut away except insofar as it is necessary to receive the gutter 80. In this respect it is like the outermost member 53.

The arrangement shown in Fig. 4 is that wherein the stream of the medium travels in parallel paths, first in one direction and then in the other, from the receiving housing G to the discharge housing H. Thus, liquid entering from the housing G, will pass through the channels formed principally by the members 52 and 53. That portion flowing through the channel formed principally by the member 53 will encounter the wall of the gutter 80 and be deflected thereby through the opening 88, the left-hand portion of the opening 89 and the opening 92, into the channel formed principally by the member 50. At the same time, that portion of the double stream which passed through the channel formed principally by the member 52 will pass through the right-hand portion of opening 89 and the channel formed principally by the member 51. The double stream will then flow counter-clockwise through the channels formed principally by the members 50 and 51 until they approach the gutter 80 on the opposite side. When this point is reached the portion of the double stream which flows through the passage formed principally by the member 51 will encounter the gutter wall and pass through opening 91, the right-hand portion of opening 93 and opening 95 into the channel formed principally by the member 48. The other portion of the stream, namely, that flowing through the channel formed principally by the member 50, will pass through the left-hand portion of opening 93 into the channel formed principally by the member 49. Finally the double stream passing through the channels formed principally by members 48 and 49 will pass out through the outlet housing H.

It will be noted that in order to provide this path it was necessary to have two bulkhead members, namely, the members 97 and 98. These are located on opposite sides of the gutter 80 and spaced from it, as clearly shown. The bulkhead 97 divides the opening 93 and unites the flanges of the members 48 and 50. Similarly, the bulkhead 98 divides the opening 89 and is united to the flanges of the members 50 and 52. The direction of travel of the double stream is clearly indicated in Fig. 4 by the various arrows.

In cutting away the flanges of the bottom forming angle irons to provide the various openings just referred to, it should be noted that this cutting away takes place without interfering with the welding connections formed between the plate portions of the angle irons. In other words, the plate portions still remain welded together to maintain the angle plate wall 55. In the case of the bottom, these welds, where the openings are made, are indicated by dash lines 99, similar to the dash lines 59 of Fig. 7.

With the channel arrangements of Figs. 4 and 7 in service, it will be clear that the heat exchange medium will enter by the housing F and pass through the several wall channels, as previously indicated in connection with our consideration of Fig. 7, and then pass through the junction housing G into the channels indicated in Fig. 4 and travel through them as just traced and finally leave the vat at the housing H. Obviously, in some instances the direction of travel might be preferably opposite to that just given. In other words, the medium might enter by way of the housing H and leave by way of the housing F.

The medium employed will, of course, depend upon the kind of treatment to be given the liquid within the vat. If it is to be heated, then hot water or steam may be used as the heating medium. If it is to be cooled then cold water, brine, ammonia, or other suitable refrigerant, may be used. These are matters which are well known and need not be further discussed.

The vat is provided with a top and cover construction C which has certain novel features. The structure includes primarily a bridging member 100 which is supported at its opposite ends upon the wall A. This bridging member 100 thus leaves on either side of it a segmental opening into the vat. The bridging member is composed of metal and preferably has its opposite ends welded or otherwise permanently secured to the upper ends of the wall structure A, the points of support being diametrically opposed. The bridge member 100 is a rather narrow member and has its longitudinal edges turned up to provide flanges 101. Lengthwise, the member 100 itself is inclined from a central high point to its ends where it engages the wall portions. At its center the member 100 is provided with a circular upturned flange 102. With this arrangement of flanges it will be seen that the bridge member 100 will carry off liquids which fall upon it and deliver them to the outer surfaces of the vat. As we shall see later, even oil drippings will pass in this way to the bridge member and be carried thereby to points beyond the vat.

At a point near its end the bridge 100 is provided with an aperture in which is located a receiving tube 103. This tube preferably is firmly secured to the bridge and terminates in an inclined portion which opens out toward the inner plate 40 of the wall structure. Thus, whenever a liquid is supplied to the interior of the vat, it will be directed at first against the outer heat exchanging wall. Obviously, the inlet tube 103 might be differently constructed and it might be very differently located than shown.

The longitudinal edges of the bridge member 100 have hinges located along them by which covers 104 may be hingedly supported. These covers are segmental in outline and along their straight sides each is provided with an upright flange 127 and a lateral flange 105, which lateral flanges, when the covers are down, overlap the bridge flanges 101. Toward the ends of the bridge member 100 there are cooperating lugs upon the bridge member and covers. The lugs 106 upon the bridge member 100 lie close to the lugs 107 upon the covers 104, there being one such pair, 106 and 107, for each hinge, and there being four hinges. One pair of hinges is associated with each cover and the edge of the bridge which lies near it. Thus there is one axis of rotation for each cover. The lugs 107 of each axis of rotation are provided with stud pins 108 which lie in said axis. These cooperate with a hole 137 in one lug 106 and a slot 109 in the other lug 106. Each slot 109 extends downward from the top of its lug at an angle of about fifteen (15) degrees from the vertical.

The covers have in turn at their outer edges inclined portions 110 which closely fit upon the inclined portions 44 at the top edge of the wall A. The covers 104 are also somewhat conical in form in order to fit upon the bridge 100 which is higher at its center than at its ends. When the covers are down tight upon the vat top, they have their top flanges 105 overlying the longitudinal bridge flanges 101. Their inclination outward and downward also insures that any liquids which may be deposited upon them will be carried to points beyond possible entrance into the vat. Obviously, with the separable pin hinges in service, the covers can be readily removed individually from the bridge. Thus removed, they and the bridge and the interior of the vat may be readily and thoroughly cleaned. Obviously, the removal of a cover 104 is brought about by lifting it up in such a way as to free its apertured and slotted lugs 106 from the bridge lugs 107. This is done by manipulating the cover first to move the one pin 108 out of the slot 109 and then the other pin 108 out of the aperture 137. To replace the cover, the operations will be similar but in the reverse order, as will be obvious.

Coming now to the agitator D, it will be noted that its shaft, which lies in the vertical axis of the vat, is made up of two lengths, a lower long length and an upper short length coupled together when the agitator is in service. The lower length, which may be variously formed, is in the present instance made up of a long tube 111 and a short rod 112 plugged into the upper end of the tube. Fitting the tube and rod together in this way provides a shoulder 113 at the upper end of the tube. The upper short length of the agitator shaft is preferably solid and of the same diameter as the rod portion of the long length. This upper length, designated 114, and the rod 112 of the lower length of shaft cooperate with each other and with a coupling sleeve 115 to unite the shaft lengths into a single operative shaft.

The lower end of the tube 111 is provided at it foot with a socket bearing 116 which is adapted to rest on a ball bearing 117 carried by the bottom of the vat. Preferably the bearing 117 is secured to the inner surface of the vat bottom. In the present instance this surface is found in the bottom of the gutter 80. Of course, if the gutter were somewhat differently located then the bearing 117 would be secured to the plate 41. The under side of the bottom plate to which the bearing is secured is backed up by a suitable backing member 118. In the present instance this is merely a block of metal positioned between the gutter 18 on the one hand and the central channel-forming member 47 on the other hand. Obviously, this thrust bearing at the lower end of the agitator shaft may be variously constructed. What is shown is merely illustrative.

The upper end of the portion 112 of the lower shaft length is cut away on one side so as to produce a notch 119 having a shoulder 120 which is positioned at right angles to the axis of the shaft. This shoulder 120 cooperates with a second shoulder 121 in a notch 122 formed at the lower end of the short shaft length 114. When the two shoulders 120 and 121 engage each other and the sleeve 115 is in coupling position, then the two lengths of the agitator shaft will be in alinement. In order to hold the sleeve 115 in its proper coupling position it is provided with a bayonet slot 123 which cooperates with a stud 124 upon the short length 114. It will be seen that when the sleeve 115 is in holding position, the stud 124 will lie in the end 125 of the bayonet slot 123. When the sleeve is to be moved out of coupling position, then the sleeve is moved lengthwise so that the stud 124 passes downward from the short end 125 of the slot; then the sleeve is rotated to bring the stud 124 to the longer portion 126 of the slot; when in line with this portion, the sleeve may be again moved longitudinally to free the stud entirely from the slot. And then when the sleeve 115 is moved down into engagement with the shoulder 113, the two shaft lengths will be entirely free of each other. Then the lengths may be readily separated. When it is desired to couple the two parts of the agitator shaft, then it is only necessary to bring the shoulders 120 and 121 into engagement and slip the sleeve 115 up into coupling position where it may be locked by the stud 124 and the bayonet slot 123.

At this point it may be noted that when removing the agitator from the interior of the vat, the scraper sections 144 are first removed from the tubular uprights 140. When this is done, the over-all dimension of the agitator frame, through and including the uprights 140, is sufficiently less than the length of the segmental openings in the top of the vat so that the entire agitator frame (the scraper sections being removed) can be passed through one of these segmental openings.

The upper end of the short length 114 of the agitator shaft is connected with the proper gearing element of a reduction gear 128. The casing of this gear 128 is connected to the casing of an electric motor 129 and the gearing is arranged so that the vertical agitator shaft will be driven through it by the electric motor, a proper reduction in speed being obtained by the gearing 128. The combined gearing and motor casing is supported upon four legs 130, 131, 132 and 139. These legs are secured at their lower ends to the bridge 100. At their upper ends the legs 130 and 131 are secured to a bracket 133 which forms part of the casing of the motor 129. On the other hand, the legs 132 and 139 are secured at their upper ends to a bracket 134 forming part of the casing of the reduction gear 128. The short shaft length 114 extends down through the opening in the center of the bridge 100, which opening is surrounded by the upturned flange 102. This opening is relatively wide, that is, sufficiently wide to allow for the lateral movement of the upper end of the long shaft length when the sleeve is removed to uncouple the two shaft lengths as before explained.

In order to keep oil drippings from passing from the gearing of the reduction gear 128 down into the interior of the vat, the short shaft section 114 is provided with a hat shaped flange 135 which extends far enough to deliver drippings outward of the bridge flange 102. Of course, the member 135 is apertured to pass the shaft section 114 and is firmly secured to it. As an additional precaution the coupling sleeve 115 is surrounded by a second flange or hat-like member 136. This member is nearer to the bridge flange 102 and, as clearly shown, extends outward of it so as to deliver drippings to the cover parts at points outward of the flange 102. It also protects the central opening within the flange 102 from receiving splashes of objectionable liquids. The oil hat 136 is removable. To this end it is split and fitted together with interlocking projections and recesses. Such split rings are common in the art and the same need not be further described. When the coupling sleeve 115 is to be moved from the coupling position to the uncoupling position, then the lower hat 136 is first separated and removed. Then the coupling sleeve is free and accessible for manipulation.

At the lower end of the agitator shaft are two oppositely extending transverse blades 138. These are shaped so as to engage the substance within the vat and force it upward as the blades are rotated. This means that the blade on one side of the agitator shaft has a curvature in one direction and that on the other side of the shaft it has a curvature in the opposite direction. This curvature is clearly indicated by the section of Fig. 12. Besides having this upward plowing action due to the transverse curvature of the blades, the latter are longitudinally shaped along their lower edges so as to have a path of travel which lies adjacent to the dished bottom 41 of the vat and at all points practically the same distance therefrom. These blades 138 form part of the frame structure of the agitator.

From the outer ends of these blades which, in a sense, constitute a single transverse member secured at its center, there arise uprights 140. There are also radial bracing members 141 which are positioned above the blades 138. These members 141 are secured at their inner ends to the shaft tube 111 and at their outer ends they are secured to the uprights 140. Two such uprights are employed. They are the same in construction. Preferably, each upright 140 takes the form of a slotted tube. At its lower end a block 143 of metal is inserted in the tube and welded to it. The associated blade 138 is secured to the upright at the point where the block 143 is located. The block 143 serves as an end support for the scrapers 144 which are arranged to be carried by the upright and to be mounted therein in sections as a stack. The lowermost scraper or scraper section 144 will engage the block 143, the next section 144 will engage the section 144 beneath it, and so on throughout the several sections in the stack. As shown in Fig. 2, five scrapers or scraper sections are carried by each of the uprights 140.

The scrapers 144 include a flat slab-like body 145, a cylindrical head 146, and an interconnecting neck 147. The head 146 is of slightly less diameter than the interior of the tubular upright 140 so that it may be slipped freely into it. The neck 147 also has a width which is somewhat less than the width of the slot 148 in the upright 140. As a result of this construction, the slab 145 of a positioned scraper may be moved laterally with reference to the upright 140. The play between the slab and the upright permits the outer end of the slab 145 to engage the inner wall 40 of the vat with some freedom of oscillation. The direction of travel of the scrapers is, so to speak, against the material in the vat. This is indicated by the arrow in Fig. 13. Because of this direction of travel, the mass of material which encounters the scrapers, forces their outer ends against the vat wall, and, as they travel around, they scrape the wall and remove the material in the vat from it. As the scrapers travel in this way around the wall 40, each scraper has its own zone to scrape, and will adjust itself independently of the other scrapers according to the wall irregularities which it encounters.

In order to keep the scrapers 144 in the uprights, and to prevent their movement out of their zones, the upright is provided with a number of openings 149 which are in pairs directly opposite each other, and serve to receive the ends of a retaining ring 150 which is made of resilient material such that it may be sprung enough to be withdrawn through the openings 149 when it is to be removed and sprung enough to be passed through those openings when it is to be placed in position. The openings 149 are arranged at different heights along the uprights, and their positions are such that each pair of holes may be used with a ring, such as illustrated. Thus, it is possible to place within the vat a single pair of scrapers, thereby providing a one-high scraper structure; or two pairs, thereby providing a two-high structure; or three for a three-high structure; or any higher desired number to provide higher structures, all of course in keeping with the height of the uprights and the sizes of the individual scrapers. The holes 149 along the uprights 140 are positioned so as to come at the tops of the different pairs of scrapers when thus set. Consequently each stack, whatever its height, may be firmly held by those rings which are placed at the top of the stack in any particular instance.

As previously pointed out, the inner vat wall 40 is composed of metal and preferably a metal which will be incontaminable to milk or any other substance with which the vat is to be used. On the other, the scrapers 144 are preferably composed of a much softer material. As a result, all of the wear which is occasioned by the rubbing of the scrapers upon the wall is taken up by the scrapers, which can be readily replaced. Preferably, too, the scrapers are of such material that they will not injure the product that is being handled by the vat. In case the vats are for handling milk or milk products, the scrapers are composed of a compound available on the market and known as "Dairy Plastic."

In this connection it may be pointed out that the scraper supports 140 must extend upward in a direction parallel to the wall 40 which is being scraped. In the embodiment shown, this direction is vertical. Obviously, it need not be vertical but may be inclined. So an upwardly and outwardly inclined wall may be associated with similarly inclined scrapers. All of this is quite obvious and it seems unnecessary to add further illustration.

In association with the agitator D, we preferably employ a baffle E. The latter includes a pair of downwardly extending rods 152 between which extends a metal plate 153 which is curled at its sides so as to embrace the rods 152. The rods 152 extend downward from the bridge 100 of the cover structure. The material carried about in the vat and agitated by the scrapers and other parts, engages the face of the plate 153, and in order to resist the force of the same, the latter is provided with a brace rod 154 which at its lower end is secured to the rear side of the plate 153 and at its upper end is secured to the bridge 100. As clearly shown, the rods 152 are connected near one edge of the bridge while the rod 154 is connected to the bridge near its other edge. The baffle is positioned inward of the path of travel of the uprights 140 and a suitable space is provided between the same to allow for the ready travel of the substance within the vat as the agitator is being rotated.

In order to provide proper channel connections from the pipes which supply and carry off the heat exchange medium, we employ, as before noted, housings F, G and H, the housings F and H being terminal housings, and the housing G being a junction housing adapted to bring about connection between the wall channels and the bottom channels. These may now be more fully considered.

The housing F, shown more particularly in Figs. 21, 22, 23, has been mentioned heretofore as the inlet housing. It may also be termed a terminal housing or port. For our purposes it may be described as an inlet, although it might be an outlet should the direction of flow be reversed. As clearly shown, this housing includes a face wall 156, end walls 157 and 158, and side walls 159 and 160. The front wall 156 is apertured near its upper end as indicated at 161. An intake pipe 162 registers with the opening 161 and is secured at its end to the face plate 156. Upon entering the housing from the pipe 162 the medium encounters a baffle plate 163. This plate has laterally extending lugs 164 which are somewhat triangular in shape and are welded at their points to the inner face of the housing wall 156. With this construction, the medium coming against the baffle plate 163 is distributed through the several openings 165 between the lugs 164 and thus spreads itself upon entering the housing. The housing itself is fitted to the plate 40, the angle iron member 45 and the uppermost of the angle iron members 46. The housing wall 157 is therefore longer than the wall 158, since the wall 157 must reach the wall 40 and the wall 158 need only reach the angle iron wall 54. At proper points, the side walls 159 and 160 are cut down in width to meet the requirements occasioned by fitting the housing to the angle irons and to the wall plate 40. When the housing F is in position against the plate 40 and the angle iron members, then the medium may pass into the two uppermost channels of the wall channel structure. This is in agreement with the channel arrangement of Fig. 7. To obtain a free passage, the angle-irons are cut away as indicated by the dotted lines 166 and 167 in Fig. 21.

Passing next to the junction housing G, it will be seen that the same is illustrated in detail in Figs. 24, 25 and 26. As there shown, the housing has a face plate 169, a bottom 170, an upper end 171, a lower end 172, and suitably shaped slide walls 173 and 174. This housing, as in the case of the housing F, overlaps angle iron members which go to make up channels for the medium. The vertical portion of the housing G overlaps the lowest two angle irons 46 of the side wall construction and its more or less horizontal portion or bottom 170 overlaps a portion of the one angle iron member 53 of the bottom construction. All the edges of the housing are secured to the adjacent angle irons or to the continuous plate formed by the side wall 40 and the bottom wall 41. Again, it is necessary to cut away portions of the angle iron structure and this is done by cutting along lines 175 and 176. In this way the medium flowing through the lowermost two channels in the wall passes into the housing G and from that housing into the outer channel formed principally by the member 53, and then, by reason of the opening 87 in the channel of the member 52, the medium also passes into the channel formed principally by the member 52. Thus at both ends of the housing there are inlets from two channels on the one hand and outlets into two channels on the other hand.

Passing now to the outlet housing H, it will be seen that the same is most fully illustrated in Fig. 3 while its location in plan is shown more particularly in Fig. 4. Obviously, this housing, like the housing F, may be termed a terminal housing or port. This is because it may be used as either inlet or outlet. But here it will be referred to as an outlet. Obviously, the medium from the channels formed principally by the members 48 and 49 will pass at once through opening 178 into the box-like enclosure 179 which constitutes the main portion of the housing H. A pipe 180 is secured at its inner end to the housing enclosure 179 and through the opening 181 receives the medium delivered, as just stated. In order to retard the flow, the housing H is provided with a baffle 182 which is the same in construction as the baffle 163 shown particularly in Fig. 23 and described at length heretofore. Obviously, if the direction of flow be reversed, so that the medium enter by the housing H and depart by the housing F, then the baffle 182 would serve to break up the incoming stream as it entered into the channels of the bottom B.

Although nothing has been said heretofore about heat insulation, it will be noted that a suitable insulation 205 is placed within the outer casing of the vat formed by the peripheral wall 42 and the bottom wall 43. It will also be noted that this insulation will be on the outside of the housings F, G and H. In other words, these housings are made flat and when finally positioned, leave space between them and the enclosing shell of the vat. This insures the presence of a reasonable amount of heat insulating material between the housings and the outer wall and bottom of the vat.

Likewise, in the previous description nothing has been said about the mounting of the vat. Preferably the same is provided wth four feet 206 and these are suitably secured to the bottom plate 43 of the vat structure. They may be positioned as indicated by dotted lines in Fig. 4.

Obviously, in carrying out the invention, alterations and modifications may be made in the structure disclosed. Accordingly we do not wish to be limited to the exact embodiment herein disclosed but aim to cover by the terms of the appended claims all those alterations and modifications which rightly come within the scope of the invention.

We claim:

1. A vat of the class described comprising a circular wall, a bottom, a central driving shaft having a given direction of rotation, supporting means extending radially from said shaft toward said wall, an upright carried by and extending upward from said support in a direction parallel to the inner surface of said wall, a plurality of flat upright scraper sections having heads set one above another in stacked relation and each head pivotally secured at one end to said upright with a lost motion connection to allow a limited lateral movement about said upright pivot and adapted at its other end to contact said inner surface in a substantially upright straight line contact, said sections lying forward of said upright in the direction of rotation whereby the contacting ends of the scraper sections when in operations adjust themselves independently of each other to surface irregularities encountered in operation, and retaining means for ready attachment to said upright adjacent said topmost section to hold the sections in stacked relation and upon removal to permit their ready withdrawal from said upright for cleaning.

2. A vat of the class described comprising a circular wall, a bottom, a central driving shaft, supporting means extending radially from said shaft toward said wall, an upright slotted tube carried by said supporting means and extending in a direction parallel to the inner surface of said wall, the slot in said tube extending lengthwise thereof and opening outward and forward relative to the direction of travel of the tube, a plurality of upright scraper sections set one above another in stacked relation and each section having a slab-like body and a cylindrical head joined by a neck, said head and body lying in the same upright plane, the sections when assembled extending outward to the vat wall and having their heads fitting within the tube and the necks within said slot with some play, whereby when in operation the free end of the slab-like body of each section will adjust itself independently of other sections to suit irregularities encountered, and thus a good scraping of the wall surface will ensue, and retaining means for ready attachment to said tube to hold said sections in stacked relation and upon its removal to permit the ready withdrawal of said sections for cleaning.

3. A vat of the class described comprising a circular wall, a bottom, a central driving shaft, supporting means extending radially from said shaft toward said wall, an upright slotted tube carried by said supporting means and extending in a direction parallel to the inner surface of said wall, a series of upright scraper sections resting one above another in a stack carried by said tube, each scraper section extending forward of said tube, considered in the direction of rotation of said shaft, and meeting the vat wall at an oblique angle, each section also having a slab-like body and a cylindrical head connected together by a neck, said head and body lying in the same upright plane, said heads fitting within said tube and said necks resting within said slot, there being some play between said necks and the walls of the tube slot, said sections being composed of a material softer than the wall surface over which they travel in operation and incontaminable to milk and milk products, and retaining means removably attached to said tube to hold said sections in stacked relation and upon its removal to permit the ready withdrawal of said sections for cleaning.

4. A vat of the class described comprising a circular wall, a bottom, a central driving shaft, supporting means extending radially from said shaft toward said wall, an upright slotted tube carried by said supporting means and extending in a direction parallel to the inner surface of said wall, the slot in said tube extending lengthwise thereof and opening outward and forward relative to the direction of travel of the tube, a series of upright scraper sections resting one above another in a stack carried by said tube, each scraper having a slab-like body extending outward to the vat wall and a cylindrical head connected together by a neck, said head and body lying in the same upright plane, said heads fitting within said tube and said necks resting within said slot, there being some play between said necks and the walls of the tube slot, and retaining means securable to said upright at different elevations for holding different numbers of said sections in said tube as desired, to suit different sized batches.

5. A vat of the class described comprising a circular wall, a bottom, a centrally positioned top bridge, said bridge and wall providing segmental openings on either side of the bridge, the chord of the arc of each of said openings having a definite length, a short length of shaft, a mounting for said short length carried by said bridge, said short length being vertical and centrally located, a long length of shaft of less length than the internal diameter of the vat extending centrally of said vat downward therein, a bearing for the lower end of said long length of shaft, a transverse member extending crosswise of said long length of shaft and near said bottom, uprights at opposite ends of said transverse member, a plurality of removable liquid-agitating members carried by each of said uprights and extending outward therefrom at an angle to the vat wall, and a coupling for connecting said shaft lengths, the spacing of said uprights being sufficiently less than said definite length of opening chord to permit ready removal of the long length of shaft and the attached parts, once said agitating members are removed.

6. A vat of the class described comprising a circular wall, a bottom, a centrally positioned top bridge, said bridge and wall providing segmental openings on either side of the bridge, the chord of the arc of each of said openings having a definite length, a short length of shaft, a mounting for said short length carried by said bridge, said short length being vertical and centrally located, an agitating frame adapted to be mounted within the vat beneath said bridge and to be removed therefrom through either of said segmental openings, said frame including a long length of shaft centrally disposed and of a length less than the internal diameter of the vat, a cross member and uprights, the overall dimension of said frame being less than the length of the available segmental openings, a bearing for the lower end of said long length of shaft, a coupling for uniting said shaft lengths together, and a plurality of removable scrapers projecting at an angle from each of said uprights and carried thereby, said scrapers being removable to render said frame of such size as to be removed through said segmental opening.

7. A vat of the class described comprising a circular wall, a centrally positioned top bridge elevated at its center and inclined outwardly and downwardly to its ends, upright longitudinal flanges along the longitudinal edges of said bridge, and covers pivoted to said bridge with axes of rotation adjacent to said longitudinal flanges, said covers having conically shaped upper surfaces with their peripheral edges flanged to fit over the top of said circular wall and their inner longitudinal edges downwardly flanged to overlap the adjacent upright flanges on said bridge, whereby any liquid falling upon said bridge or covers will be drained off without passing into the vat.

8. A vat of the class described comprising an outer enclosing wall, a centrally positioned top bridge leaving segmental openings on either side, upright flanges along the longitudinal edges of said bridge, said bridge having its upper surface inclined downwardly toward its ends from a central high point, said bridge having a central opening at its high point, an upright flange surrounding said opening, an upper shaft length extending through said opening, a bearing for said upper shaft length above said opening, an upper oil hat fitted to said upper shaft length and extending outward, a lower shaft length in alignment with said upper shaft length, a coupling sleeve for securing said shaft lengths together, said coupling sleeve being positioned below said upper hat, and a lower split oil hat secured to said sleeve and extending outward therefrom beyond the flange about said opening, whereby drippage along said shaft will fall upon the bridge top outward of the flange about the opening therein, even when said lower hat is separated into its parts and removed from said sleeve for cleaning purposes.

9. A vat of the class described comprising a circular wall, a bottom, a centrally positioned top bridge, said bridge and wall providing segmental openings on either side of the bridge, the chord of the arc of each of the said openings having a definite length, a short length of shaft extending up into a wide opening in said bridge, a mounting for said short length carried by said bridge, said short length being vertically and centrally located, a long length of shaft extending centrally of said vat downward therein and upward into the opening in said bridge, a bearing for the lower end of said long length of shaft, a transverse member extending cross-wise of said long length of said shaft and near said bottom, uprights at opposite ends of said transverse member, said uprights being narrow in a radial direction, a plurality of removable liquid-agitating members carried by each of said uprights and extending outward therefrom at an oblique angle to the vat wall, a baffle plate secured to and extending downward from the bridge in close proximity to the path of travel of said uprights and inward thereof, and a coupling for connecting said shaft lengths, said coupling extending through said opening the spacing of said uprights being sufficiently less than said definite length of opening chord to permit said ready removal of the long length of shaft and attached parts, once said agitating members are removed.

10. A vat of the class described comprising a circular wall, a bottom, a centrally positioned top bridge having a wide central opening, said bridge and wall also providing segmental openings on either side of said bridge, the chord of the arc of each of said segmental openings having a definite length, a short length of shaft, a mounting for said short length carried by said bridge, said short length being vertically and centrally located and extending downward through said central opening, an agitating frame adapted to be mounted within the vat beneath said bridge and to be removed therefrom through either of said segmental openings, said frame including a long length of shaft centrally disposed and adapted to extend upward into said central opening, a cross-member and uprights, the over-all lateral dimension of the frame being less than the length of the available segmental openings and said uprights being narrow in a radial direction, a bearing for the lower end of said long length of shaft, a coupling for uniting said shaft lengths together where they meet in said central opening, a baffle plate secured to and extending downward from the bridge into close proximity to the path of travel of said uprights and inward thereof, and a plurality of removable scrapers projecting laterally outward from each of said uprights and carried thereby, said scrapers being removable to render said frame of such size as to be removed through segmental opening.

11. A vat of the class described comprising a circular wall, a bottom, a centrally positioned top bridge, said bridge and wall providing segmental openings on either side of the bridge, the chord of the arc of each of said openings having a definite length, a short length of shaft, a mounting for said short length carried by said bridge, said short length being vertically and centrally located, a long length of shaft extending centrally of said vat down therein, a bearing for the lower end of said long length of shaft, a transverse member extending crosswise of said long length of shaft and near said bottom, uprights and opposite ends of said transverse shaft, said uprights being radially narrow, a plurality of removable liquid agitating members carried by each of said uprights and extending outward therefrom and bearing against the vat wall at an oblique angle, a baffle plate secured to and extending downwardly from the bridge into close proximity to the path of travel of said uprights and inward thereof, two oppositely extending blades connected to the lower end of said central shaft and the lower ends of said uprights and operative when rotating to raise substance from the bottom, and a coupling for connecting said shaft lengths, the spacing of said uprights being sufficiently less than said definite length of opening chord to permit ready removal of the long length of shaft and the attached parts, once said agitating members are removed.

12. A vat of the class described comprising a circular wall, a bottom, a centrally positioned top bridge, said bridge and wall providing segmental openings on either side of the bridge, the chord of the arc of each of said openings having a definite length, a short length of shaft, a mounting for said short length carried by said bridge, said short length being vertically and centrally located, agitating frame adapted to be mounted within the vat beneath said bridge and to be removed therefrom through either of said segmental openings, said frame including a long length of shaft centrally disposed, a cross member and uprights, a pair of oppositely directed blades, the overall dimension of said frame being less than the length of the available segmental openings and said uprights being radially narrow, a bearing for the lower end of said long length of shaft, a coupling for uniting said shaft lengths together, a baffle plate secured to and extending downward past the bridge into close proximity to the path of travel of said uprights and inward thereof, and a plurality of scrapers removably supported by said uprights to extend outwardly beyond the same, and to be removable to permit the removal of said frame through either of said segmental openings.

13. A vat of the class described comprising a circular wall, a top member mounted upon said wall, said member being elevated at its center and inclined therefrom toward its periphery and having a longitudinal edge, an upstanding flange upon said edge, a cover pivoted to said member along its longitudinal edge. said cover having an upper surface higher at its center and sloping toward its periphery and having a longitudinal edge cooperating with the longitudinal edge of said member, an upright flange along said longitudinal edge of said cover extending upward near the upstanding flange on said member, and an additional flange extending laterally over the same, whereby any liquid falling upon the cover will be drained off without passing into the vat.

14. A vat of the class described comprising a circular wall, a top member mounted upon said wall, said member being elevated at its center and inclined therefrom toward its periphery and having a longitudinal edge, an upstanding flange upon said edge, a cover pivoted to said member along its longitudinal edge, said cover having an upper surface higher at its center and sloping toward its periphery and having a longitudinal edge cooperating with the longitudinal edge of said member, an upright flange along said longitudinal edge of said cover extending upward near the upstanding flange on said member, and means adapted to cover the flange, whereby any liquid falling upon the cover will be drained off without passing into the vat.

15. A vat of the class described comprising a circular wall, a bottom, a central driving shaft, supporting means extending radially from said shaft toward said wall, an upright carried by and extending upward from said support in a direction parallel to the inner surface of said wall, a support toward the lower end of said upright, an upright scraper section resting upon said support, a second upright scraper section resting upon said first section in stacked relation, said upright sections being secured to said upright at one end and at the other, the slot in said tube extending lengthwise thereof and opening outward and forward relative to the direction of travel of the tube, the connections with said upright being lost motion connections whereby the respective scraper sections when in operation are pressed by the material in the vat against the vat wall and automatically adjust themselves to irregularities in the wall scraped, the stacked relation permitting of the use of variable numbers of sections according to the batch employed, and means operative at different heights to retain the uppermost section in place to hold the sections beneath it and detachable to allow free removal of all the sections for cleaning.

16. A vat of the class described comprising a circular wall, a bottom, a central driving shaft, supporting means extending radially from said shaft toward said wall, an upright slotted tube carried by said supporting means and extending in a direction parallel to the inner surface of said wall, a supporting block in the slot of said tube near its bottom, a scraper section resting upon said block and extending forward of said tube at an oblique angle to the vat wall, a second similarly positioned scraper section resting upon said first section in stacked relation, each section having a slab-like body and a cylindrical head joined by a neck, all lying in the same plane, the sections when assembled having the heads fitting within the tube and the necks within said slot with some play, to permit of the adjustment of the scraping end of the slab when in operation to suit irregularities in the encountered wall, the stacked relation permitting of the use of variable number of sections according to the size of the batch employed and of the ready withdrawal for cleaning purposes, and means for removably holding the top section in place upon the tube, thereby holding all the sections when in operation and releasing all for removal for cleaning purposes when not in operation.

17. A vat of the class described comprising a circular wall, a top member mounted upon said wall, a reduction gear mounted upon and spaced from said top member, a short length of shaft extending downward from said gear into a wide opening through said top, an agitator frame within said vat having a long length of shaft entering the opening in said top member, said long and short lengths overlapping and having transverse interfitting shoulders, a sleeve coupling for removably securing said long and short lengths of shaft together in said opening, and a ball bearing for said long length of shaft in the lower part of said vat.

18. A vat of the class described comprising a circular wall, a top member mounted upon said wall, said top member having a wide flanged opening therethrough, the flange of which projects upward, a reduction gear mounted above and spaced from said top, a short length of shaft extending downward from said gear into said opening, an agitator within said vat, an operating shaft for said agitator extending up into said opening, cooperating notches having transverse shoulders toward the ends of said long and short shafts adapted to interfit, a sleeve for overlapping said shaft ends and removable therefrom to permit shaft separation, an oil hat extending beyond the flange about said opening to drain off surplus oil or the like on to the top of said top member beyond the flange, and a ball bearing for said long length of shaft in the lower part of said vat.

TIMOTHY MOJONNIER.
JULIUS J. MOJONNIER.
OLIVER W. MOJONNIER.

CERTIFICATE OF CORRECTION.

Patent No. 2,280,529.                 April 21, 1942.

TIMOTHY MOJONNIER, ET AL.

It is hereby certified that error appears in the printed specification of the above numbered patent requiring correction as follows: Page 1, first column, line 35, for the word "prevent" read --provide--; page 3, first column, line 54, for "member" read --members--; page 8, first column, line 64, claim 1, for "operations" read --operation--; page 10, second column, lines 16, 17, 18 and 19, claim 15, for "other, the slot in said tube extending lengthwise thereof and opening outward and forward relative to the direction of travel of the tube" read --other end reaching outward and forward into operative engagement with said vat wall to scrape the same--; and that the said Letters Patent should be read with this correction therein that the same may conform to the record of the case in the Patent Office.

Signed and sealed this 7th day of July, A. D. 1942.

Henry Van Arsdale, (Seal)                                   Acting Commissioner of Patents.